G. F. BROTT.
Cylindrical and Coil Boilers.
No. 211,649. Patented Jan. 28, 1879.
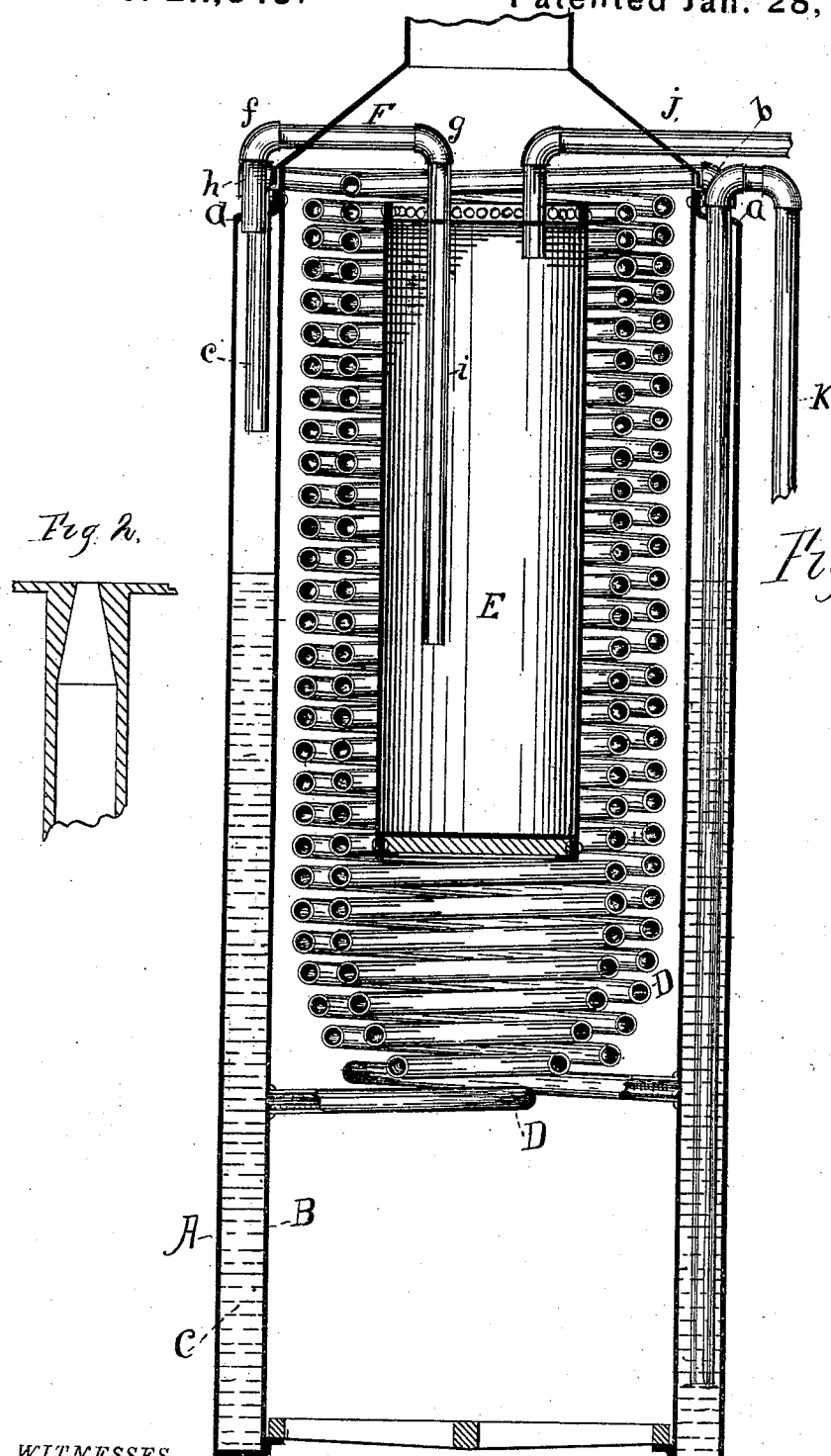
WITNESSES
O. E. Duffy
T. C. Brecht
INVENTOR
Geo. F. Brott
By
ATTORNEY

UNITED STATES PATENT OFFICE.

GEORGE F. BROTT, OF WASHINGTON, DISTRICT OF COLUMBIA.

IMPROVEMENT IN CYLINDRICAL AND COIL BOILERS.

Specification forming part of Letters Patent No. 211,649, dated January 28, 1879; application filed December 31, 1878.

*To all whom it may concern:*

Be it known that I, GEORGE F. BROTT, of Washington city, in the county of Washington and District of Columbia, have invented certain new and useful Improvements in Cylindrical and Coil Boilers; and I do hereby declare that the following is a full, clear, and exact description thereof, which will enable others skilled in the art to which they appertain to make and use the same, reference being had to the accompanying drawings, and to the letters of reference marked thereon, which form a part of this specification.

Figure 1 is a vertical longitudinal section of my boiler; and Fig. 2, a detail view, in section, of the connecting-nozzle.

My invention relates to that class of steam-generators known as "coil-boilers," and has for its object the quick generation of steam, lightness and facility for transportation, cheap in first cost, easily of repair, separation of steam from the water, superheating the steam, and therefore furnishing it dry to the engine, and to the general arrangement of the parts, in which simplicity and economy are combined; and to these ends my invention consists, first, in combining, with a double cylindrical shell, one or more coils of pipe contracted at its or their lower ends, and located within said shell, and connected at its lower end to the lower portion of the shell, and at its upper end to the upper portion of the shell, by which a rapid and continuous circulation of water is maintained without the intervention of a pump; second, in the construction and arrangement of a separator and superheater combined and located within said coil, for the better liberation of steam from the water, and superheating the same in such a manner as to be furnished clean and dry to the engine; third, in the combination of the cylindrical shell, the coil or coils contracted at their lower ends, and the separator and superheater, the latter being provided at its bottom with refractory material, for the better protection of the same from the intense heat of the furnace; and, fourth, in the general arrangement of the parts, their peculiar location, the feed-pipes, and the steam inlet and discharge pipes, all of which will more fully hereinafter appear.

It is well-known that pure land-water is almost unknown; that many of our largest manufacturing works are situated near the sea, or where the most serious effects are produced on the boilers from the use of impure feed-water; that boiler-incrustation is a constant source of complaint, and the water in many of our rivers is little better than liquid mud or sand. These facts, with numberless others to the same effect, are well known to practical engineers. Now, to remedy these defects, and to insure the advantages before mentioned, is the object of my invention.

It may, however, be remarked that, as a general rule, the particles entering with the feed-water are small, the steam generated around and beneath them balloons them up to the surface of the water, when they are carried over into the space C, when the steam will be liberated and the particles of sediment will descend, and thus the impalpable particles, by their subsidence upon the boiler-plate in ordinary boilers, concrete into scale, the effect of which on the heating-surface is, that in proportion to the amount of solid matter accumulated, combined with its non-conductive property, so will the evaporation be retarded; but with my device, by the rapid circulation of the water through the coils and the partial heating of the water before entering the coils, the foreign or calcareous matter is retained in the shell, and that which does float to the surface of the water is prevented from entering the steam-pipe by its peculiar location; and should any foreign matter go over with the steam into the separator, it will be retained therein, thus preventing any foreign matter— such as sand or other hard substance—when carried to the engine, from cutting the valves and other bearings, and thus causing great annoyance and loss of time. The mud and sediment may be blown off from time to time from the bottom of the shell, and any water of condensation that may accumulate in the superheater may be drawn off by any well-known means.

It will be noticed that a bushing or nozzle is located at the intersection of the lower ends of the coil with the water-leg of the boiler. This nozzle is placed in the coil permanently, as shown and described, and the size of the opening to admit the water into the coil through the nozzle will depend upon the diameter of the coil itself—that is, the nozzle should be of such size as to admit sufficient water to about half fill the coil at all times, which will enable the steam to be generated faster and pass off more readily than when the coil is full of water. At the end of this nozzle which enters the coil I make a tapering-end opening, running it out to a knife-edge, so that when the coils are blown out any mud or sediment remaining in them will not lodge against the end, but glide past the knife or flaring edge, that would otherwise be trapped were a shoulder allowed to remain on the end of the nozzle.

Referring more particularly to the accompanying drawings, I will now describe more in detail the construction and operation of my improved boiler.

I first construct a single plain cylinder, A, of any approved size, either of steel, iron, or any other metal that will withstand a high steam-pressure. I then construct a second or smaller one, B, of less diameter than the first, but a little shorter longitudinally. On the first one I turn a flange, as shown at $a$, and then turn said flange as shown at $b$, and to which is secured the upper end of cylinder B. At the bottom of the shell or cylinder I place the well-known cast or wrought iron ring, to which the inner or outer shells are fastened or riveted. The grate-bars are located at the lower portion of the cylinder. I thus form a plain double cylinder without heads, and between which an annular space, C, is formed, and which forms the water-legs of the boiler.

Within this cylinder I centrally locate one or more coils of pipe, D. The lower ends of these coils are secured to the shell a sufficient distance above the grate, leaving a chamber below, and which form my combustion-chamber or furnace. The upper ends of the coils I pass up above the end of the shell, and then by a return-bend I continue them down through the flange $a$ into the shell a sufficient distance to discharge any steam or water that may be carried over through the pipe, as shown at $c$.

The velocity of the water circulating through the coils is so great that the inner surface of the coils is kept clear of any sediment or incrustation that would otherwise precipitate and concrete to the said surface, such foreign matter being forced over into the shell or space C.

I may here remark that the feed-water is first introduced to the shell or cylinder through a pipe extending through the flange at its upper end, and down inside of said shell to near the bottom thereof. By this means the water is heated more or less before its commingling with the water in the space C, where it is additionally heated before it enters the coils D. These coils, in their formation, are rounded or contracted at the end nearest the fire, and present in a large degree the shape of the bottom of a pot. The object of this form is to present a greater heating-surface where the heat is most intense, and also to retard the flame and prevent it as much as possible from taking the form of a corkscrew, which it will invariably do when passing through a straight cylindrical orifice.

By the above means the flame is made to spread itself and to impinge equally upon all sides of the coil. Of course the coils will adjust themselves to the contraction and expansion caused by the different temperatures to which they may be exposed without straining or loosening any of the joints, and thereby leakage is prevented.

Within these coils I locate centrally a vessel or drum, E, and what I call a "superheater and separator." The upper end of this drum is nearly on a horizontal line with the top of the coil and cylinders, and the lower end about half-way down the outer cylinder or shell, A B. The drum E is about one-half the diameter of the inner shell, B, and its location allows a free and sufficient draft of the products of combustion to pass between the interstices of and around the pipes forming the coil. Thus the flame is forced to take a zigzag course, by which it is compelled to give up most of its heat before its exit to the atmosphere.

The bottom of the drum or vessel E is provided with a coating of some refractory material, such as asbestus, fire-clay, or any other substance that will withstand intense heat. By this means the bottom is protected against the fire and prevented from burning out.

This vessel also performs the function of a baffle-plate, for the better distribution of the hot products of combustion through the coils and against the inner side of the shell B; but the real function of drum E is to superheat the steam and separate it from any foreign or extraneous matter that may enter with it from the outer shell or space, C.

The steam is admitted to the drum E by means of a pipe, F. This pipe is provided with two return-bends, $f$ and $g$, and is composed of three sections—viz., short vertical pipe $h$, horizontal pipe F, and long vertical pipe or section $i$. The short pipe $h$ enters the shell A at its top, just far enough only to receive the steam, then passes up and connects with horizontal pipe F, and in turn with pipe $i$, which extends down into vessel or drum E to near its bottom.

The object of making pipe $i$ so long is so that, after the steam is delivered through it, the steam is made to impinge upon the inner sides of the drum, and thus part with its water and become dry before its exit at pipe $j$, which leads to the engine.

Over the coils, and resting upon the upper end of the shell, is a conical cap or hood, which forms the smoke-box, and which incloses the top of the boiler and pipe inside the shell B. This hood is fitted so as to be removable when desired, so as to withdraw or take the coils or drum out of the shell B. Said coils and drum are also intended to be made removable, for the purpose of repairs, &c.

Operation: Water is forced, by a pump, injector, or any other well-known means, into pipe K, which extends through the top of the shell A B, and down to near the bottom of space C, by which it is partially heated. This action continues until the space C is nearly filled, allowing only a small steam-space at its top. While the space C is being filled the water is also flowing into the coils through their lower connection until it is on a level with the water in space C.

Fire is now applied, and as the steam is generated in the coil it rises and is conveyed into the shell or space C. When the fire becomes intense, the action of the water in the coils becomes more violent and the circulation more rapid. Thus it will be seen that the water in the coils is nearly flashed into steam as fast as it enters.

The weight of the column of water in the space C above the lower ends of the coils forces a continuous supply into the coils as fast as generated, and the action of the heat on the coils and the force of the said column combined forces the steam and other substance in the coils into the cylindrical or annular space C, where any foreign substance going over with the steam is caused to precipitate to the bottom of said space, and the steam, although in a saturated condition, is conveyed into the superheater in a comparatively pure state; but should there be any sediment carried over with the steam to the superheater while the boiler is foaming, it is again separated by the arrangement of the pipes in the said superheater.

I may add that it will be very readily seen that many modifications may be made in the detail of this boiler without departing from the spirit of my invention; and it is also well known that many attempts have been made to construct coil boilers, superheaters, separators, &c., none of which I claim; but What I do claim, and desire to secure by Letters Patent, is—

1. In a steam-boiler, the combination of the cylindrical portion or shell A B and coil or coils D, located within said shells and connected at their bottom and top, whereby a rapid and constant circulation of water is maintained without the intervention of a pump, the upper ends of said coils projecting downward into the top of said cylinder or shell, substantially as shown and described.

2. In a steam-boiler consisting of shell A B, coil or coils D, contracted at their lower ends, and connected to the top and bottom of said shell, in combination with a superheater and separator located centrally within the coils, for the purpose herein shown and described.

3. In a steam-boiler consisting, essentially, of the shell A B, coil or coils D, separator or superheater E, located centrally within said coils, the said central vessel, E, being connected with the top of said shell by a steam-pipe extending down into the superheater, by which the steam is exposed to the action of the flame before its exit, in the manner set forth and described.

4. The combination, with the cylindrical shell A B of a steam-boiler, of the coil D, contracted at its lower end to partially retard the flame, and the central superheater or vessel, E, connected to the upper end of said shell, the bottom of the superheater being provided with a covering of refractory material, and serving the office of a baffle-plate, in the manner shown and described.

5. The combination, with the water-leg of a steam-boiler and a vessel or coil centrally located within said boiler, of the bushing or nozzle located in the connecting-pipe, as shown in Fig. 2, whereby the quantity of water fed to the coil or vessel is controlled, said nozzle being provided with a flaring or tapering mouth on its inner end, constructed as shown, and for the purpose specified.

In testimony that I claim the foregoing as my own I affix my signature in presence of two witnesses.

GEO. F. BROTT.

Witnesses:
  H. B. ZEVELY,
  HUGH WHITE.